(12) United States Patent
Pursifull et al.

(10) Patent No.: US 11,152,878 B2
(45) Date of Patent: Oct. 19, 2021

(54) SYSTEM AND METHODS IMPROVING GEAR SHIFTING OF A TRANSMISSION

(71) Applicant: Ford Global Technologies, LLC, Dearborn, MI (US)

(72) Inventors: Ross Dykstra Pursifull, Dearborn, MI (US); Naginder Gogna, Farmington Hills, MI (US); Joseph Thomas, Holt, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 16/265,411

(22) Filed: Feb. 1, 2019

(65) Prior Publication Data
US 2020/0252014 A1 Aug. 6, 2020

(51) Int. Cl.
| | | |
|---|---|---|
| *H02P 9/06* | (2006.01) | |
| *F16H 63/40* | (2006.01) | |
| *H02P 101/25* | (2016.01) | |
| *F02B 67/06* | (2006.01) | |

(52) U.S. Cl.
CPC ............ *H02P 9/06* (2013.01); *F16H 63/40* (2013.01); *B60Y 2300/19* (2013.01); *F02B 67/06* (2013.01); *H02P 2101/25* (2015.01)

(58) Field of Classification Search
CPC .... H02P 9/06; H02P 7/282; H02P 9/00; H02P 9/08; H02P 9/14; H02P 9/36; H02P 9/38; H02P 1/00; H02P 3/00; H02P 1/46; H02P 1/04; H02P 1/18; H02P 1/24; H02P 1/26; H02P 1/265; H02P 1/42; H02P 1/465; H02P 7/29; H02P 21/00; H02P 23/00; H02P 25/00; H02P 27/00; H02P 9/007; H02P 27/04; H02P 27/06; H02P 6/00; H02P 3/12; H02P 3/22; H02P 7/06; H02P 23/009; H02P 9/04; F02B 67/06; F16H 63/40; B60W 30/188
See application file for complete search history.

(56) References Cited

U.S. PATENT DOCUMENTS

| | | | |
|---|---|---|---|
| 5,730,094 A | 3/1998 | Morris | |
| 7,023,102 B2* | 4/2006 | Itoh | B60W 10/30 290/400 |
| 7,461,621 B2* | 12/2008 | Ota | F02D 13/0234 123/179.4 |
| 7,990,085 B2* | 8/2011 | Furukawa | B60L 50/16 318/142 |
| 2007/0046265 A1* | 3/2007 | Nakamura | H02P 9/14 322/27 |
| 2007/0236098 A1 | 10/2007 | Kusase et al. | |
| 2016/0036308 A1* | 2/2016 | Bailey | H02K 3/28 290/45 |

OTHER PUBLICATIONS

El-Hasan, T., "Development of Automotive Permanent Magnet Alternator with Fully Controlled AC/DC Converter," Energies, vol. 11, No. 2, Jan. 24, 2018, 28 pages.

* cited by examiner

*Primary Examiner* — Antony M Paul
(74) *Attorney, Agent, or Firm* — Geoffrey Brumbaugh; McCoy Russell LLP (57) ABSTRACT

Systems and methods for improving shifting of a transmission are described. The systems and methods may be applied to automatic or manual transmissions, but the systems and methods may be particularly suited for automatic transmissions. In one example, electrical input to an alternator and electrical output from the alternator is adjusted in response to a request to upshift a transmission.

20 Claims, 5 Drawing Sheets

SYSTEM AND METHODS IMPROVING GEAR SHIFTING OF A TRANSMISSION

FIELD

The present description relates to a system and methods for improving gear shifting of a transmission via controlling operation of an alternator. The system and methods may be suitable for vehicles that include an automatic or a manual transmission.

BACKGROUND AND SUMMARY

A vehicle's transmission may be upshifted or downshifted from time to time to improve engine efficiency and vehicle performance. During an upshift the transmission is shifted from a lower gear (e.g., first gear) to a higher gear (e.g., second gear). At a time just before the upshift, the vehicle's engine is rotating at a first speed and the vehicle's wheels are rotating at a second speed that is a function of engine speed and a ratio of the lower gear. Because of a ratio difference between the lower gear and the higher gear, engine speed may be reduced during the upshift so that when the higher gear is engaged, a large torque disturbance does not occur within the driveline. In particular, the engine speed may be reduced to a speed that is a function of the wheel speed and the higher gear ratio so that when the higher gear is engaged, a smooth shift may be performed with a reduced torque disturbance in the driveline. One way to reduce engine speed is to at least partially close the engine's throttle so that engine torque may be reduced, but engine speed may not be reduced to the new speed fast enough to provide a smooth shift. Therefore, it may be desirable to provide a way of improving transmission shifting. Also, it has been noted that a fast shift, which is aided by a rapid engine speed decrease, may contribute to fuel economy.

The inventors herein have recognized the above-mentioned issues and have developed a method for improving transmission shifting, comprising: increasing a field current of an alternator while maintaining or reducing alternator load applied to an engine via a controller in response to a request to upshift a transmission.

By increasing an alternator field current while maintaining or reducing alternator load that is applied to an engine, it may be possible to improve transmission shifting. In particular, the alternator field current may be increased so that the alternator may be prepared to apply a large load to the engine, thereby reducing engine speed to a speed that is a function of wheel speed and a new gear that is about to be engaged. At the same time, the load that is applied to the engine is not increased via the increased field current so that engine speed is not reduced while the off-going clutch may still be engaged. Thus, at the onset of an upshift, engine speed is not reduced early so that vehicle speed may be maintained, yet the alternator is being prepared to have capacity to apply a large load to the engine once the off-going clutch is released or nearly released. Such control may not be available with only alternator field control since increasing the alternator's field current may lead to higher alternator torque.

The present description may provide several advantages. In particular, the approach may improve transmission gear shifting. Further, the approach may control alternator load output independently from the control of the alternator field so that the mechanical load that is applied to the engine may be controlled independently from the field, thereby allowing the alternator's field to develop without changing the mechanical load that is applied to the engine. Further still, the approach may control alternator electrical current output independently from the control of the alternator field so that the electrical energy that is applied to the vehicle electric power consumers may be controlled independently from the field during a transmission gear shift.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
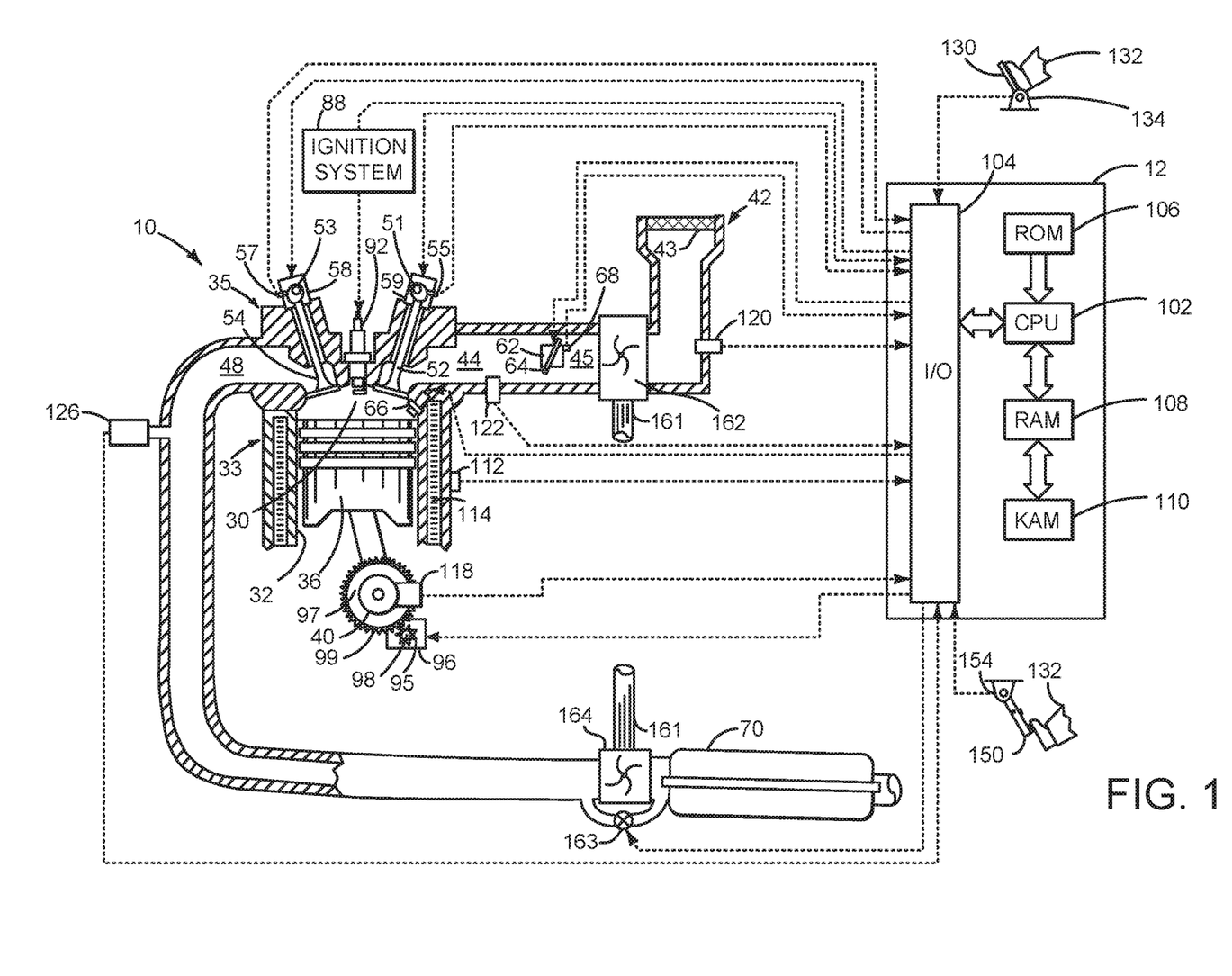
FIG. 1 is a schematic diagram of an engine for providing power to a vehicle electrical system.
Figure 2:
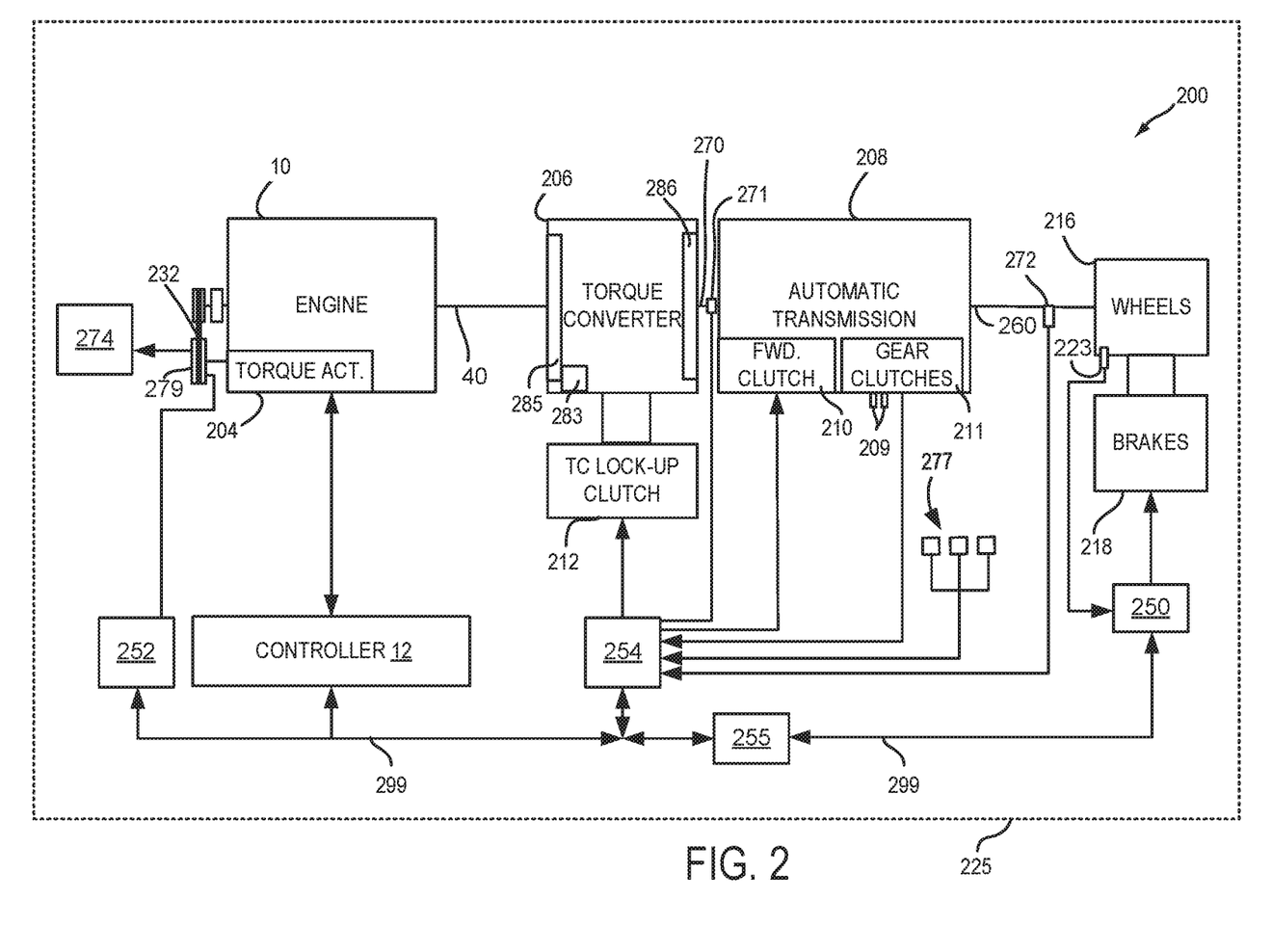
FIG. 2 is a schematic diagram of a vehicle driveline.
Figure 3:
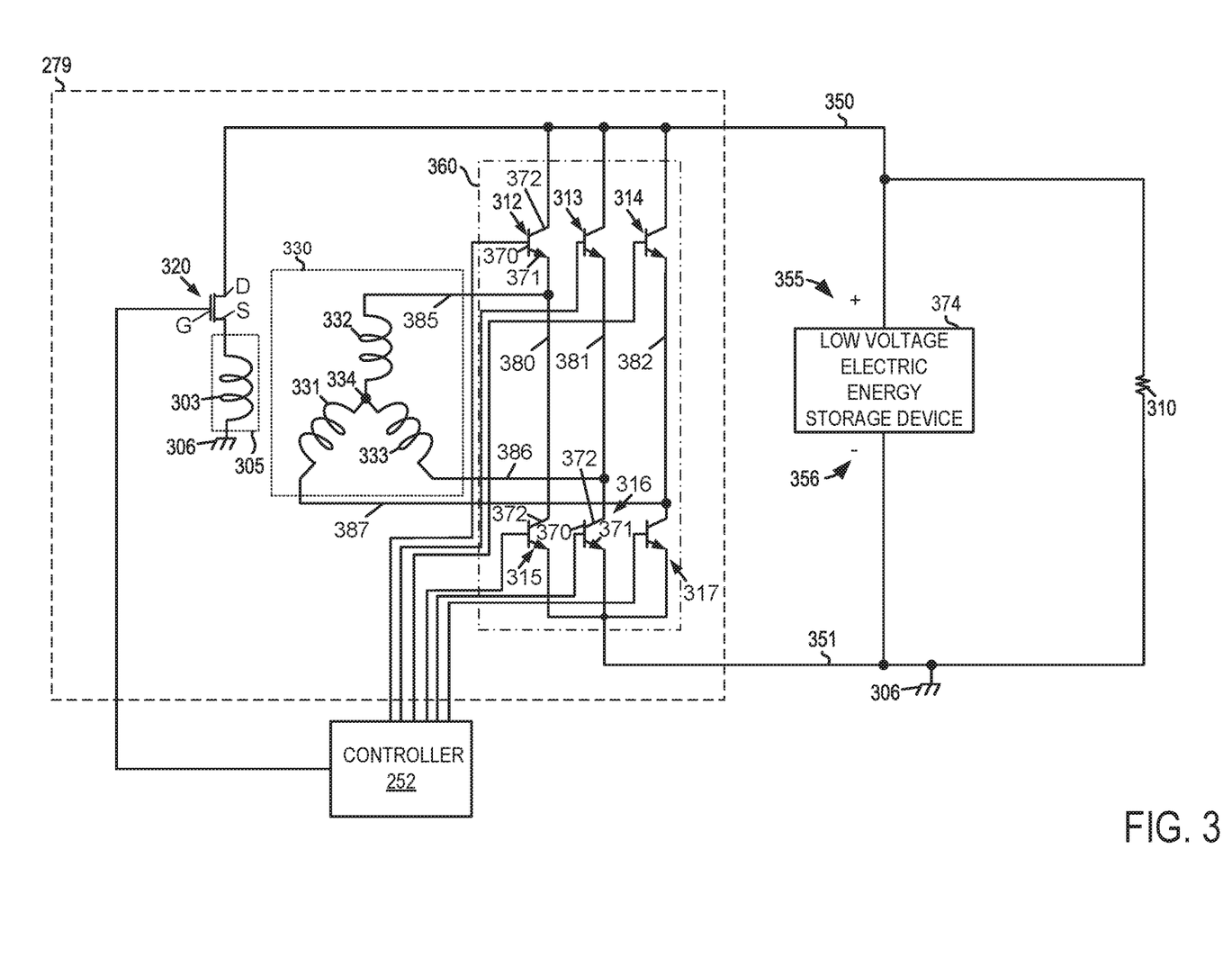
FIG. 3 is a schematic diagram of an example alternator.

The present description is related to shifting a transmission and adjusting a load applied to the engine during the shift so that engine speed may closer match transmission input shaft speed. The engine may be an internal combustion engine as shown in FIG. 1. The internal combustion engine may be included in a driveline or powertrain of a vehicle as shown in FIG. 2. The vehicle may include an alternator as shown in FIG. 3. The transmission may be shifted and the alternator may be operated according to the sequence of FIG. 4. A flowchart of a method for shifting a transmission and adjusting operation of an alternator is shown in FIG. 5.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3 and employs the actuators shown in FIGS. 1-3 to adjust engine and driveline operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake poppet valve 52 and exhaust poppet valve 54. Each intake and exhaust valve may be operated by an intake camshaft 51 and an exhaust camshaft 53. The position of intake camshaft 51 may be determined by intake camshaft sensor 55. The position of exhaust camshaft 53 may be determined by exhaust camshaft sensor 57. Intake valves may be held open or closed over an entire engine cycle as the engine rotates via deactivating intake valve actuator 59, which may electrically, hydraulically, or mechanically operate intake valves. Alternatively, intake valves may be opened and closed during a cycle of the engine. Exhaust valves may be held open or closed over an entire engine cycle (e.g., two engine revolutions) as the engine rotates via deactivating exhaust valve actuator 58, which may be electrically, hydraulically, or mechanically operate exhaust valves. Alternatively, exhaust valves may be opened and closed during a cycle of the engine.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Alternatively, compressor 162 may be electrically powered. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, and brake controller 250. In some examples, electric machine controller 252 may be included in engine controller 12, or vehicle system controller 255, or in alternator 279. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10. Engine 10 may be started with an engine starting system shown in FIG. 1. Engine output torque may be provided to three phase alternator 279 via belt 232, and alternator 279 may supply electrical energy to electric energy storage device (e.g., battery) 274. Alternator 279 may be coupled to crankshaft 40 or a camshaft (e.g., 51 or 53). The output voltage of alternator 279 may be adjusted via adjusting a speed of first alternator 279, a field current supplied to first alternator 279, and an electric output regulator via controller 252.

An engine output torque may be transmitted to torque converter 206. Torque converter 206 includes a turbine 286 to output torque to input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request. Torque converter 206 also includes pump 283 that pressurizes fluid to operate gear clutches 211. Pump 283 is driven via impeller 285, which rotates at a same speed as engine 10.

Automatic transmission 208 includes gear clutches (e.g., gears 1-10) 211 and forward clutch 210. Automatic transmission 208 is a fixed step ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210. In some examples, automatic transmission 208 may be replace with a manual transmission.

A frictional force may be applied to wheels 216 by engaging friction wheel brakes 218. In one example, friction wheel brakes 218 may be engaged in response to the human driver pressing his/her foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his/her foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then commands engine 10 in response to the driver demand torque. Vehicle system controller 255 requests the engine torque from engine controller 12. If engine torque is less than a transmission input torque limit (e.g., a threshold value not to be exceeded), the torque is delivered to torque converter 206, which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 274, a charging torque (e.g., a negative alternator torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then commands friction brakes 218 (e.g., desired friction brake wheel torque).

Accordingly, torque control of the various powertrain components may be supervised by vehicle system controller 255 with local torque control for the engine 10, transmission 208, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from alternator 279 by adjusting current flowing to and from field and/or armature windings as described in greater detail in the description of FIG. 3. Electrical output from alternator 279 may be provided in a stationary mode where the transmission is in park or neutral. Additionally, electrical output from the alternator 279 may be provided in a non-stationary mode where the vehicle is traveling on a road.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), alternator temperature sensors, and BISG temperature sensors, and ambient temperature sensors.

Brake controller 250 receives wheel speed information via wheel speed sensor 223 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-skid and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Referring now to FIG. 3, a detailed schematic of alternator 279 is shown. Alternator 279 is shown electrically coupled to a positive side 355 of electric energy storage device 374 and vehicle electrical consumers (e.g., lights, infotainment system, starter motor, etc.) 310 via conductor 350. Alternator 279 is shown electrically coupled to a negative side 356 of electric energy storage device 274 and vehicle electrical consumers (e.g., lights, infotainment system, starter motor, etc.) 310 via conductor 351. Conductor 351 is shown electrically coupled to ground potential 306.

Alternator 279 includes a field winding 303 that is wound to a rotor 305 and three armature coils 331-333 that are wound to a stator 330. Armature coils 331-333 are directly coupled together at node 334 and each of these coils provides one of three-phase electrical output of alternator 279. Alternator 279 also includes an alternator field current control field effect transistor (FET) 320 and electrical output regulator section 360. Electrical output regulator section 360 also provides a rectification function to provide direct current to electric energy storage device 374. FET includes a drain (D), gate (G), and source (S). The drain is electrically coupled to conductor 350. The gate is electrically coupled to controller 252, and the source is electrically coupled to alternator field winding 303. Electrical output regulator section 360 includes the transistors 312-317. The transistors 312-317 are shown as bipolar transistors, but FETs or other known transistors may take the place of transistors 312-317. Each of the transistors 312-317 includes a base 370, emitter 371, and collector 372. Conductor 380 electrically couples emitter 371 of transistor 312 to the collector 372 of transistor 315. Similarly, conductor 381 electrically couples transistor 313 to transistor 316, and conductor 382 electrically couples transistor 314 to transistor 317. Conductor 385 electrically couples one side of coil 332 to conductor 380 and the other side of coil 332 is electrically coupled to node 334. Conductor 387 electrically couples one side of coil 331 to conductor 382 and the other side of coil 331 is electrically coupled to node 334. Conductor 386 electrically couples one side of coil 333 to conductor 381 and the other side of coil 333 is electrically coupled to node 334.

Controller 252 may adjust current supplied to field winding 303 via supplying a signal to field effect transistor (FET) 320. Current flow through field winding 303 may be increased to increase electrical output of alternator 279 at electrical output regulator section 360. Current flow through field winding 303 may be decreased to decrease electrical output of alternator 279 at electrical output regulator section 360.

Controller 252 may also provide pulse width modulated signals to transistors 312-317 of the electrical output regulator section 360. Output voltage and current of alternator 279 may be adjusted via adjusting the pulse widths of signals supplied to transistors 312-317. For example, the output current from alternator 279 may be reduced via supplying a shorter duration pulse width signal (e.g., shorter transistor on or closed time) to the base of transistors 312-317. Conversely, the output current from the alternator may be increased via supplying a longer duration pulse width signal (e.g., longer transistor on or closed time) to the base of transistors 312-317. Controller supplies pulse width modulated control signals to transistors 312-317 at a frequency that is synchronous with the rotational frequency of rotor 305.

All electrical output of alternator 279 to electric energy storage device 274 and vehicle electric consumers 310 may be ceased via opening all of transistors 312-317. When all transistors 312-317 are in an open state, the mechanical load that alternator 279 applies to engine 10 is reduced to a low value. In a full load mode, transistors 312-314 may be open (e.g., deactivated) while transistors 315-317 are closed (e.g., activated) to generate maximum load applied by the alternator to the engine and no electrical output to electric energy storage device 274 and vehicle electric consumers 310. Rather, electrical current is circulated through coils 331-333 in the full load mode. The full load mode may be enabled during transmission gear shifting to reduce engine speed during an upshift.

Thus, the system of FIGS. 1-3 provides for a system for shifting a transmission, comprising: an engine; an alternator coupled to the engine; a transmission coupled to the engine; and a controller including executable instructions stored in non-transitory memory to increase a field current of the alternator while maintaining or reducing alternator load applied to the engine in response to a request to upshift a transmission. The system further comprises additional instructions to decrease the field current in response to completing a transmission upshift generated via the request to upshift the transmission. The system further comprises additional instructions to maintain or decrease alternator electrical output supplied to vehicle power consumers external to the alternator in response to the request to upshift the transmission. The system further comprises further instructions to adjust a pulse width supplied to an output regulator of the alternator in response to the request to upshift the transmission. The system includes where adjusting the pulse width includes decreasing the pulse width in response to the request to upshift the transmission. The system further comprises additional instructions to increase an alternator load applied to the engine via adjusting a three phase regulator in response to releasing an off-going clutch.

Figure 4:
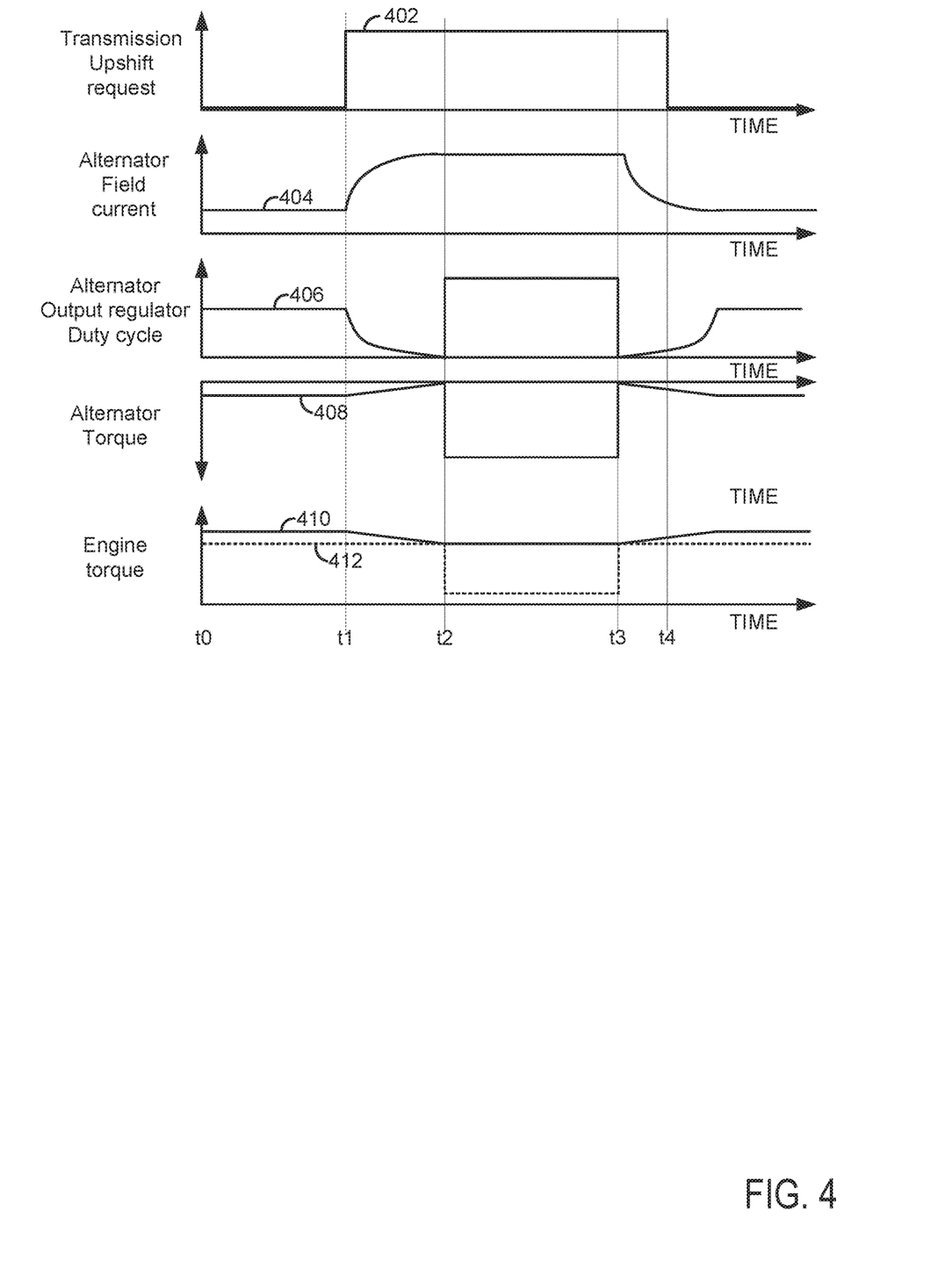
FIG. 4 shows alternator control during a transmission upshift.
Figure 5:
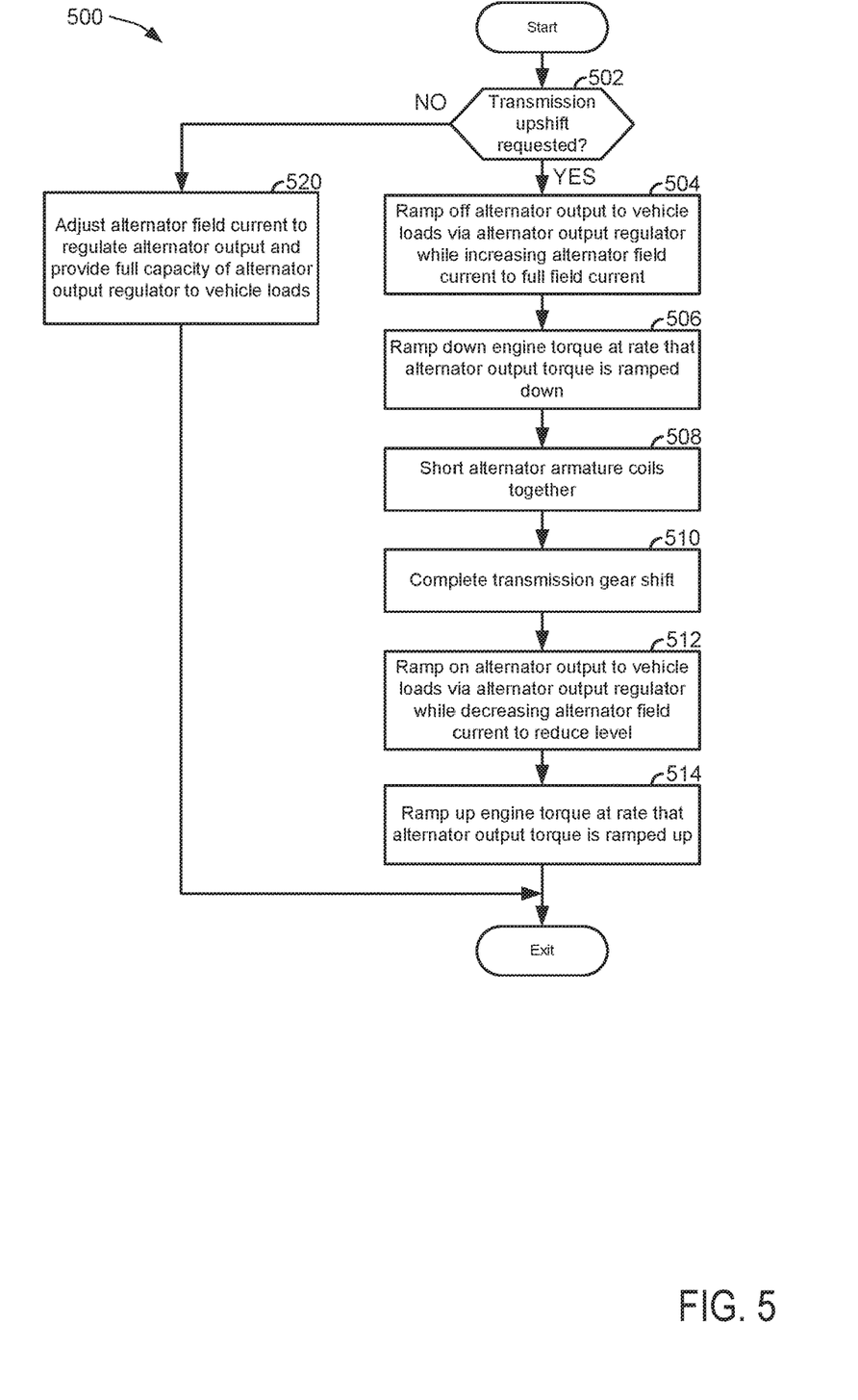
FIG. 5 shows an example method for shifting a transmission and controlling an alternator during the shift.

Referring now to FIG. 4, a prophetic example sequence showing alternator operation during a transmission upshift is presented. The plots are time aligned and occur at a same time. The sequence of FIG. 4 may be generated via the system of FIGS. 1-3 in cooperation with the method of FIG. 4. The vertical lines at time t0-t4 represent times of interest in the sequence.

The first plot from the top of FIG. 4 is a plot of a transmission gear upshift (e.g., a request to shift from first gear to second gear) versus time. The vertical axis represents the state of the transmission gear upshift request. An upshift is requested when trace 402 is at a higher level near the vertical axis arrow. An upshift is not requested when trace 402 is at a lower level near the horizontal axis. The upshift may be in progress while the transmission upshift is being requested. In other words, the transmission upshift request may remain asserted until the requested upshift is complete. The horizontal axis represents time and time increase from the left side of the plot to the right side of the plot. Trace 402 represents the transmission upshift request.

The second plot from the top of FIG. 4 is a plot of alternator field current versus time. The vertical axis represents alternator field current and alternator field current increases in the direction of the vertical axis arrow. The horizontal axis represents time and time increases from the left side of the figure to the right side of the figure. Trace 404 represents alternator field current.

The third plot from the top of FIG. 4 is a plot of duty cycle of a signal that is applied to a transistor (e.g., 315) of the alternator's electrical output regulator section 360 via the controller 252 (each of transistors 312-317 may receive a signal with such a representative duty cycle). The vertical axis represents the duty cycle of the signal that is applied to the transistor of the alternator's electrical output regulator section 360. The value of the duty cycle increases in the direction of the vertical axis arrow. The horizontal axis represents time and time increases from the left side of the figure to the right side of the figure. Trace 406 represents the duty cycle value of the signal that is applied to of the alternator's electrical output regulator section 360.

The fourth plot from the top of FIG. 4 is a plot of torque that the alternator applies to the engine versus time. The vertical axis represents alternator torque and the magnitude of the alternator torque increases in the direction of the vertical axis. The alternator torque is indicated as a negative torque since is consumes engine torque. The horizontal axis represents time and time increases from the left side of the figure to the right side of the figure. Trace 408 represents the torque that the alternator applies to the engine.

The fifth plot from the top of FIG. 4 is a plot of engine torque versus time. The vertical axis represents engine torque and engine torque increases in the direction of the vertical axis arrow. The horizontal axis represents time and time increases from the left side of the figure to the right side of the figure. Trace 310 represents engine torque delivered to the engine crankshaft and trace 312 represents net engine torque provided to a torque converter or transmission input shaft (e.g., engine torque minus alternator torque).

At time t0, the engine is running (e.g., combusting fuel and rotating) (not shown) and the transmission is engaged in a first lower gear (not shown). The alternator field current is at a lower level that provides a desired voltage at the alternator output and the alternator supplies electrical power to a battery and vehicle electrical consumers (not shown). The alternator electrical output regulator section 360 duty cycle is at a higher level and the alternator torque that is applied to the engine is at a lower level. The engine torque is at a higher level and the net engine torque is slightly below the engine torque. Such conditions may be present when the engine is accelerating the vehicle just prior to shifting the transmission.

At time t1, a transmission gear upshift is requested and the alternator field current is increased so that the alternator may eventually apply a higher load torque to the engine later during the upshift. The slowly changeable field current begins to be adjusted to a maximum limit of alternator power absorbed at the pulley. The alternator electrical output regulator section duty cycle is decreased so that electrical output of the alternator may be maintained or decreased while the field current is increasing. Further, reducing the alternator electrical output regulator section duty cycle reduces the mechanical load torque that the alternator applies to the engine. The engine torque is reduced via adjusting an engine torque actuator (e.g., throttle, spark timing, cam timing, etc.) so that the net engine torque is not changed by reducing the alternator torque via the alternator electrical output regulator section. Between time t1 and time t2, the off-going clutch begins to be released (not shown).

There are essentially two methods of modulating alternator output: 1. field current which may be changed slowly over many hundreds of milliseconds; and 2. synchronous control of rectifying transistors which changes the output quickly. Slow acting field control may be more electrically efficient than output control so the alternator may predominately be operated in filed control.

At time t2, the off-going clutch (e.g., the clutch that applies the lower transmission gear) is nearly fully released (not shown) and the duty cycle of the transistor is increased to indicate that transistor 315 is turned on. Transistors 316 and 317 are also turned on (not shown) and transistors 312-314 are turned off (not shown). Transistors 315-317 may be turned on at a 100 percent duty cycle to apply full load of the alternator to the engine. The alternator load increases in magnitude in response to the alternator electrical output regulator section adjustment. The net engine torque is reduced by the amount of torque that the alternator applies to the engine, thereby reducing the speed of the engine (not shown). The on-coming clutch (e.g., the clutch that is engaging the higher gear) may begin to engage at time t2.

This transfers the energy from the slowing the engine into the alternator. Alternatively, one could dump this energy into a storage device such as a battery. Typically, a 12-volt battery system would hit its limit of energy uptake during this period, which may send the system to an undesirable voltage of 18 or 19 volts. Therefore, the engine's energy is reduced via alternator heating rather than attempting to store it in the battery.

At time t3, the on-coming clutch is fully engaged so the alternator torque that is applied to the engine is reduced via closing transistors 317-317 (e.g., 0% duty cycle), thereby increasing the net engine torque that is delivered to the torque converter or the transmission input shaft. The alternator field current is reduced since full alternator mechanical load is no longer needed for the shift and the duty cycle of the signal that is applied to the transistor (e.g., 315) of the alternator's electrical output regulator section begins to increase so that the alternator may supply power to the battery and vehicle electric power consumers.

Between time t3 and time t4, the transmission upshift continues with the on-coming clutch's torque capacity being increased (not shown) and the alternator field current being reduced. The duty cycle of the signal that is applied to the transistor of the alternator's electrical output regulator section continues to increase, thereby increasing alternator electrical output power to the battery and the vehicle electrical power consumers. The alternator torque increases as the duty cycle is increased and the engine torque is increased so that the net engine torque output is equal to the driver demand torque. The upshift completes at time t4 and the alternator field current and output section are adjusted to provide the requested power to the battery and the vehicle electric power consumers.

In this way, the alternator field current and the electrical output regulator of the alternator may be simultaneously adjusted to provide changes in net engine torque that may smooth an upshift. Further, adjustments to the field current and the electrical output regulator may be coordinated with opening of the off-going clutch and closing of the on-coming clutch.

Referring now to FIG. 5, a method for upshifting a transmission and controlling an alternator during the upshift is shown. The method of FIG. 5 may provide the sequence shown in FIG. 4 in conjunction with the system of FIGS. 1-3. Further, at least portions of the method of FIG. 5 may be incorporated into a controller as executable instructions stored in non-transitory memory, while other portions of the method may be actions performed in the physical world via the system.

At 502, method 500 judges if a transmission upshift is requested. A transmission upshift may be requested when vehicle operating conditions meeting conditions of a shift schedule that is stored in controller memory. For example, if the vehicle is accelerating and if it exceeds a threshold speed while the accelerator pedal is applied more than a threshold amount, a transmission upshift from a lower gear (e.g., $1^{st}$ gear) to a higher gear ($2^{nd}$ gear) may be requested. If method 500 judges that a transmission upshift is requested, the answer is yes and method 500 proceeds to 504. Otherwise, the answer is no and method 500 proceeds to 520.

At 520, method 500 adjusts the alternator's field current as a function of a desired alternator output voltage. In addition, the duty cycle of the alternator's electrical output regulator section 360 is adjusted to supply the alternators maximum output for the present amount of alternator field current. This allows the field current to be the sole regulator over alternator electrical output. Method 500 proceeds to exit.

At 504, method 500 ramps off (e.g., reduces) the alternator's electrical output to the vehicle's battery and electric power consumers. The alternator's electrical output may be ramped off by adjusting (e.g., lowering) a duty cycle supplied to transistors 312-317. The transistor duty cycle may be adjusted while increasing the amount of field current to the maximum field current such that the torque that the alternator applies to the engine is reduced. In addition, the off-going clutch (e.g., the clutch that operates the engaged lower gear during the upshift) may begin to be released. Method 500 proceeds to 506.

At 506, method 500 ramps down (e.g., reduces) engine torque at the rate that alternator torque applied to the engine is reduced so that the net engine torque is equal to the driver demand torque. The engine torque may be reduced via closing a throttle, retarding spark timing, or adjusting cam timing. In this way, the input torque to the transmission is maintained so that a driveline torque disturbance may not be generated. Method 500 proceeds to 508.

At 508, method fully opens transistors 312-314 and fully closes transistors 315-317 so that coils 331-333 are connected through transistors 315-317. In one example, the transistors may be operated in this way in response to the off-going clutch being fully released or being nearly fully released. In this way, alternator's electrical output to the battery and vehicle electrical consumers is reduced to zero and the alternator mechanical load applied to the engine is a maximum, noting that field current may be at a maximum. However, it should be noted that field current need not be adjusted to a maximum level. Rather, the amount of field current may be a function of how much torque is desired to be applied to the engine via the alternator. The alternator's armature coils may be shorted together in this way just before or just after the off-going clutch is fully released. Method 500 proceeds to 510.

At 510, method 500 applies the on-coming clutch to engage the higher gear during the upshift. The on-coming clutch is commanded to fully close. Transistors 315-317 are commanded open to reduce the mechanical load that is applied by the alternator to the engine when the on-coming clutch is being closed or when the on-coming clutch is fully closed. Method 500 proceeds to 512

At 512, method 500 ramps on (e.g., increases) the alternator's electrical output to the vehicle's battery and electric power consumers. The alternator's electrical output may be ramped on by adjusting (e.g., increasing) a duty cycle supplied to transistors 312-317. The transistor duty cycle may be adjusted while decreasing the amount of field current to provide a desired alternator output voltage. Method 500 proceeds to 514.

At 514, method 500 ramps up (e.g., increases) engine torque at the rate that alternator torque applied to the engine is increased so that the net engine torque is equal to the driver demand torque. The engine torque may be increased via adjusting an engine torque actuator (e.g., throttle, spark, camshaft, etc.). In this way, the input torque to the transmission is maintained during the upshift so that a driveline torque disturbance may not be generated. Method 500 proceeds to exit.

Thus, alternator field current may be adjusted while adjusting output of an electrical output regulator to change torque applied to the engine from zero to near full alternator torque in a time that is less than it takes for the alternator's field to fully develop. As such, the alternator's output torque control may be more responsive during a transmission gear shift.

The method of FIG. 5 provides for a method for improving transmission shifting, comprising: increasing a field current of an alternator while maintaining or reducing alternator load applied to an engine via a controller in response to a request to upshift a transmission. The method further comprises adjusting the field current responsive to an electrical load applied to the alternator when a transmission is not being shifted. The method includes where the alternator is a three phase electric machine. The method includes where the alternator includes a rectification circuit that supplied direct current to an electric energy storage device. The method further comprises rotating an armature of the alternator via an engine. The method includes where the field current is increased via adjusting output of a transistor that is electrically coupled to a field coil of the alternator. The method further comprises supplying electrical power from the alternator to ancillary vehicle electrical loads. The method further comprises increasing the alternator load applied to the engine in response to releasing an off-going clutch.

The method of FIG. 5 also provides for a method for improving transmission shifting, comprising: increasing a field current of an alternator while maintaining or decreasing alternator electrical output supplied to vehicle power consumers external to the alternator via a controller in response to a request to upshift a transmission. The method includes where the electrical output supplied to the vehicle power consumers is adjusted via an alternator output regulator. The method further comprises adjusting pulse width modulation of the alternator output regulator to maintain or decrease alternator electrical output supplied to vehicle power consumers external to the alternator. The method further comprises increasing alternator electrical output supplied to vehicle power consumers external to the alternator in response to completion of a transmission upshift. The method further comprises further adjusting the field current responsive to an electrical load applied to the alternator when a transmission is not being shifted. The method further comprises decreasing the field current in response to completing an upshift generated via the request to upshift the transmission.

In another representation, the method of FIG. 5 provides for a method for improving transmission shifting, comprising: adjusting current flow into an alternator via a controller and electric power output of the alternator via the controller and an output regulation circuit in response to a request to upshift a transmission. The method further comprises shorting coils of the alternator together in response to the request to upshift the transmission. The method includes where the coils are shorted together via transistors. The method further comprises controlling a mechanical load applied to via the alternator to an engine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for improving transmission shifting, comprising:
increasing a field current of an alternator and reducing electrical output of the alternator to electrical loads applied to the alternator to maintain or reduce a load the alternator applies to an engine via a controller in response to a request to upshift a transmission.

2. The method of claim 1, further comprising adjusting the field current responsive to an electrical load applied to the alternator when the transmission is not being shifted.

3. The method of claim 1, where the alternator is a three phase electric machine.

4. The method of claim 3, where the alternator includes a rectification circuit that supplied direct current to an electric energy storage device.

5. The method of claim 1, further comprising rotating an armature of the alternator via an engine.

6. The method of claim 1, where the field current is increased via adjusting output of a transistor that is electrically coupled to a field coil of the alternator.

7. The method of claim 1, further comprising supplying electrical power from the alternator to ancillary vehicle electrical loads.

8. The method of claim 1, further comprising increasing the load the alternator applies to the engine in response to releasing an off-going clutch.

9. A method for improving transmission shifting, comprising:
increasing a field current of an alternator and shorting three coils of the alternator together via closing three transistors via a controller while upshifting a transmission.

10. The method of claim 9, further comprising maintaining or decreasing alternator electrical output supplied to vehicle power consumers external to the alternator via adjusting an alternator output regulator.

11. The method of claim 10, further comprising adjusting pulse width modulation of the alternator output regulator to maintain or decrease alternator electrical output supplied to vehicle power consumers external to the alternator.

12. The method of claim 11, further comprising increasing alternator electrical output supplied to vehicle power consumers external to the alternator in response to completion of a transmission upshift.

13. The method of claim 9, further comprising further adjusting the field current responsive to an electrical load applied to the alternator when a transmission is not being shifted.

14. The method of claim 9, further comprising decreasing the field current in response to completing an upshift generated via a request to upshift the transmission.

15. A system for shifting a transmission, comprising:
an engine;
an alternator coupled to the engine;
a transmission coupled to the engine; and
a controller including executable instructions stored in non-transitory memory to increase a field current of the alternator and reduce electrical output of the alternator to electrical loads applied to the alternator to maintain or reduce a load the alternator applies to the engine in response to a request to upshift a transmission.

16. The system of claim 15, further comprising additional instructions to decrease the field current in response to completing a transmission upshift generated via the request to upshift the transmission.

17. The system of claim 15, further comprising additional instructions to decrease alternator electrical output supplied to vehicle power consumers external to the alternator and short three coils of the alternator together via three transistors in response to the request to upshift the transmission.

18. The system of claim 15, further comprising further instructions to adjust a pulse width supplied to an output regulator of the alternator in response to the request to upshift the transmission.

19. The system of claim 18, where adjusting the pulse width includes decreasing the pulse width in response to the request to upshift the transmission.

20. The system of claim 15, further comprising additional instructions to increase an alternator load applied to the engine via adjusting a three phase regulator in response to releasing an off-going clutch.

* * * * *